United States Patent [19]

Nakayama et al.

[11] Patent Number: 4,899,285
[45] Date of Patent: Feb. 6, 1990

[54] SYSTEM AND METHOD FOR MEASURING A POSITION OF A MOVING OBJECT WITH A HYBRID NAVIGATION APPARATUS

[75] Inventors: Okihiko Nakayama, Kamakura; Toshiyuki Itoh; Katsuhiko Mizushima, both of Yokosuka, Japan

[73] Assignee: Nissan Motor Company, Limited, Japan

[21] Appl. No.: 66,159

[22] Filed: Jun. 25, 1987

[30] Foreign Application Priority Data

Jun. 26, 1986 [JP] Japan .............................. 61-148050

[51] Int. Cl.$^4$ .......................................... G06F 15/50
[52] U.S. Cl. ................................... 364/453; 364/449; 342/357
[58] Field of Search ............... 364/449, 453, 454, 457, 364/459, 571; 342/357, 358, 451; 73/178 R

[56] References Cited

U.S. PATENT DOCUMENTS

| | | | |
|---|---|---|---|
| 4,254,465 | 3/1981 | Land | 364/454 |
| 4,402,049 | 8/1983 | Gray | 364/453 |
| 4,405,986 | 9/1983 | Gray | 364/453 |
| 4,630,056 | 12/1986 | Noguchi et al. | 342/357 |
| 4,672,382 | 6/1987 | Fukuhara et al. | 342/451 |
| 4,713,767 | 12/1987 | Sato et al. | 364/454 |
| 4,731,613 | 3/1988 | Endo et al. | 342/451 |

FOREIGN PATENT DOCUMENTS 60-135817 6/1986 Japan .

*Primary Examiner*—Gary Chin
*Attorney, Agent, or Firm*—Lowe, Price, Leblanc, Becker & Shur

[57] ABSTRACT

A system and method for measuring a position of a moving object such as a vehicle using a hybrid-type navigation apparatus. In the system and method, at least two measurement results of an electromagnetic wave position measuring apparatus (such as a GPS position measuring apparatus) are evaluated to determine whether they are reliable with respect to the those derived by an integration calculation position measuring apparatus incorporated in the system together with the electromagnetic wave position measuring apparatus on the basis of the corresponding measurement results by means of the integration calculation position measuring apparatus. When they are determined to be highly reliable, a measurement result of the electromagnetic wave position measuring apparatus subsequent to those evaluated is set to a reference position on the basis of which the integration calculation position measuring apparatus measures the position of the moving object. Consequently, a highly reliable measurement of the position of the moving object can always be achieved.

14 Claims, 4 Drawing Sheets

SYSTEM AND METHOD FOR MEASURING A POSITION OF A MOVING OBJECT WITH A HYBRID NAVIGATION APPARATUS

BACKGROUND OF THE INVENTION

1. Field of the Invention

The present invention relates to a system and method for measuring a position of a moving object such as a vehicle with a hybrid navigation apparatus, the hybrid navigation apparatus being the combination of an electromagnetic-wave type position measuring apparatus and an integration calculation position measuring apparatus.

2. Description of the Prior Art

A Japanese Patent Application First Publication (Tokkai) sho No. 60-135817 exemplifies a conventional hybrid-type position measuring system entitled to a running guide apparatus for an automotive vehicle.

In the conventional hybrid position measuring system disclosed in the above-identified Japanese Patent Application Publication, an electromagnetic wave navigation apparatus constituted by the electromagnetic wave position measuring apparatus and inferential navigation apparatus constituted by the integration calculation position measuring apparatus are complementarily combined in the position measuring system and when a reception state of the electromagnetic wave from a GPS (Global Positioning System) geostationary satellite becomes worse (low signal-to-noise ratio), the electromagnetic wave navigation apparatus is switched to the inferential navigation apparatus to continuously make an accurate measurement of a position of the vehicle in an area of the earth.

However, the conventional hybrid position measuring system disclosed in the above-identified Japanese Patent Application Publication has a problem that measurement results of the electromagnetic wave position measuring apparatus are used as reference positions of the integration calculation position measuring apparatus so that each of the measurement results of the electromagnetic wave position measuring apparatus is directly set to the reference position on the basis of which the integration calculation position measuring apparatus measures the position of the vehicle even if large errors are included in the measurement results of the electromagnetic wave position measuring apparatus. Consequently, since an erroneous result of measurement is outputted or set to the reference position, a reliable measurement result of the present position of the vehicle cannot always be achieved.

SUMMARY OF THE INVENTION

With the above-described problem in mind, it is an object of the present invention to provide a system and method for measuring a position of a moving object which can always achieve an accurate measurement of the position of the moving object.

It is another object of the present invention to provide the system and method for measuring the position of the moving object in which a reliable measurement result of the electromagnetic wave position measuring apparatus can be outputted as the measured position of the moving object.

It is a further another object of the present invention to provide the system and method for measuring the position of the moving object in which at least two measurement results of the electromagnetic wave position measuring apparatus are evaluated to confirm whether they are accurate as compared with those simultaneously derived by an integration calculation position measuring apparatus.

It is still another object of the present invention to provide the system and method for measuring the position of the moving object in which a measurement result of the electromagnetic wave position measuring apparatus subsequent to the two measurement results thereof which are confirmed to be reliable is set to the reference position of the integration calculation position measuring apparatus.

The above-described objects can be achieved by providing a system for measuring a position of a moving object, comprising: (a) first means for receiving an electromagnetic wave required for the measurement of the position of the moving object and for measuring the position of the moving object on the basis of the received electromagnetic wave; (b) second means for calculating an integration of a product between a movement direction and a movement speed of the moving object with respect to time to derive a distance and direction of the moving object and for measuring the position of the moving object from the sum of data on the calculated distance and direction of the moving object and a reference position; (c) third means for evaluating a reliability of at least two measurement results of the first means with respect to measurement results of the second means positionally corresponding to those of the first means; and (d) fourth means for setting a measurement result of the first means subsequent to the evaluation of the measurement results of the first means by the third means as the reference position in the second means when the third means evaluates that the two measurement results of the first means are reliable.

The above-described objects can be achieved by providing a system for a vehicle, comprising: (a) first means for receiving an electromagnetic wave required for a measurement of a position of the vehicle and deriving the position of the vehicle on the basis of the received electromagnetic wave; (b) second means for inferentially deriving the position of the vehicle with respect to a reference position on the basis of a calculation result of an integration of a product of a moving direction and speed of the vehicle with respect to time, the reference position being derived from the position of the vehicle derived by the first means; (c) third means for evaluating each measurement result of the first means in terms of its reliability as compared with each corresponding measurement result of the second means and setting one of the measurement results subsequent to at least two consecutive measurement results of the first means which are evaluated to be reliable as the reference position in the second means; and (d) fourth mean for outputting a measurement result of the first means subsequent to the two measurement results of the first means as the position data of the vehicle.

The above-described objects can be achieved by providing a method for measuring a position of a moving object, comprising the steps of: (a) measuring the position of the moving object using an electromagnetic wave position measuring apparatus; (b) measuring the position of the moving object using an integration calculation position measuring apparatus in which the position of the moving object is measured by the sum of a calculated distance and direction of the moving object and a reference position, the calculated distance and direction of the moving object being an integration of a product between the movement direction and movement speed of the moving object with respect to time; (c) evaluating a reliability of at least two measurement results of the first means with respect to measurement results of the integration calculation position measuring apparatus positionally corresponding to those of the electromagnetic wave position measuring apparatus; and (d) setting a measurement result of the electromagnetic wave position measuring apparatus subsequent to the measurement results of the electromagnetic wave position measuring apparatus evaluated in the step (c) as the reference position when the measurement results of the electromagnetic wave position measuring apparatus are reliable.

DETAILED DESCRIPTION OF THE PREFERRED EMBODIMENT

Reference will hereinafter be made to the drawings in order to facilitate understanding of the present invention.

Figure 1:
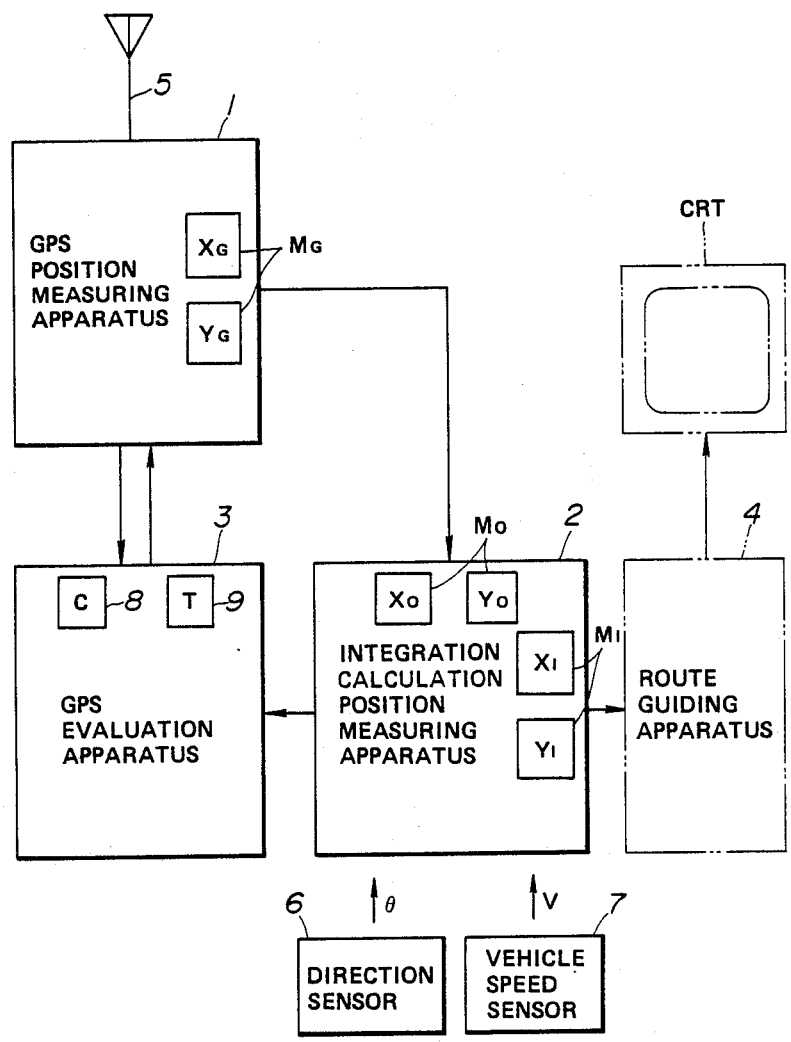
FIG. 1 is a circuit block diagram of a system for measuring a position of a moving object in a preferred embodiment according to the present invention.

FIG. 1 shows a circuit block diagram of a hybrid-type position measuring system for a moving object such as a vehicle in a preferred embodiment according to the present invention.

Figure 2A:
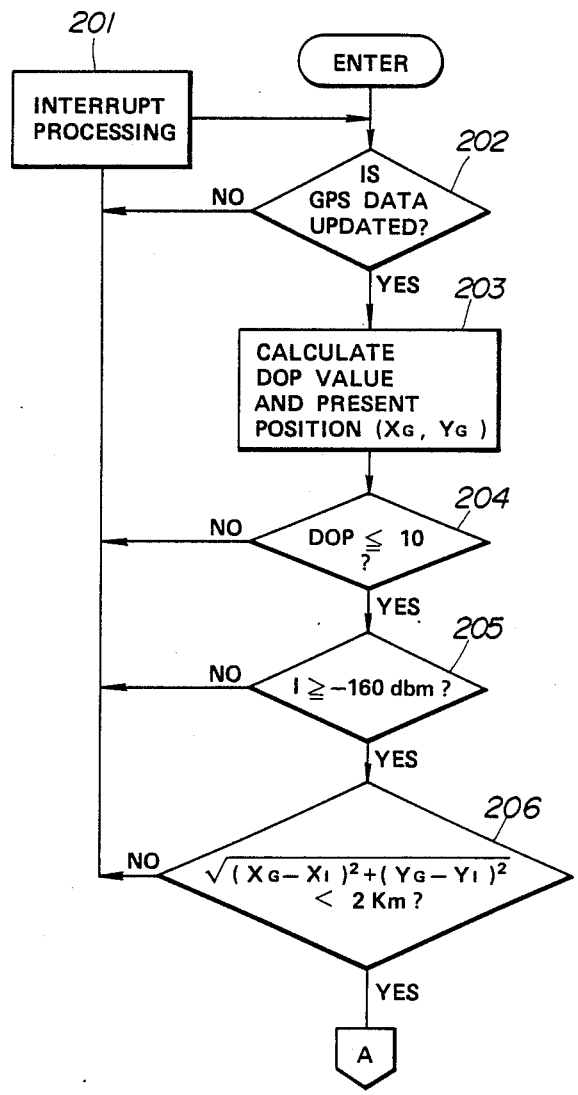
FIGS. 2(A) and 2(B) are portions of flowcharts, together showing processing of the measurement results of the position measuring system shown in FIG 1.
Figure 2B:
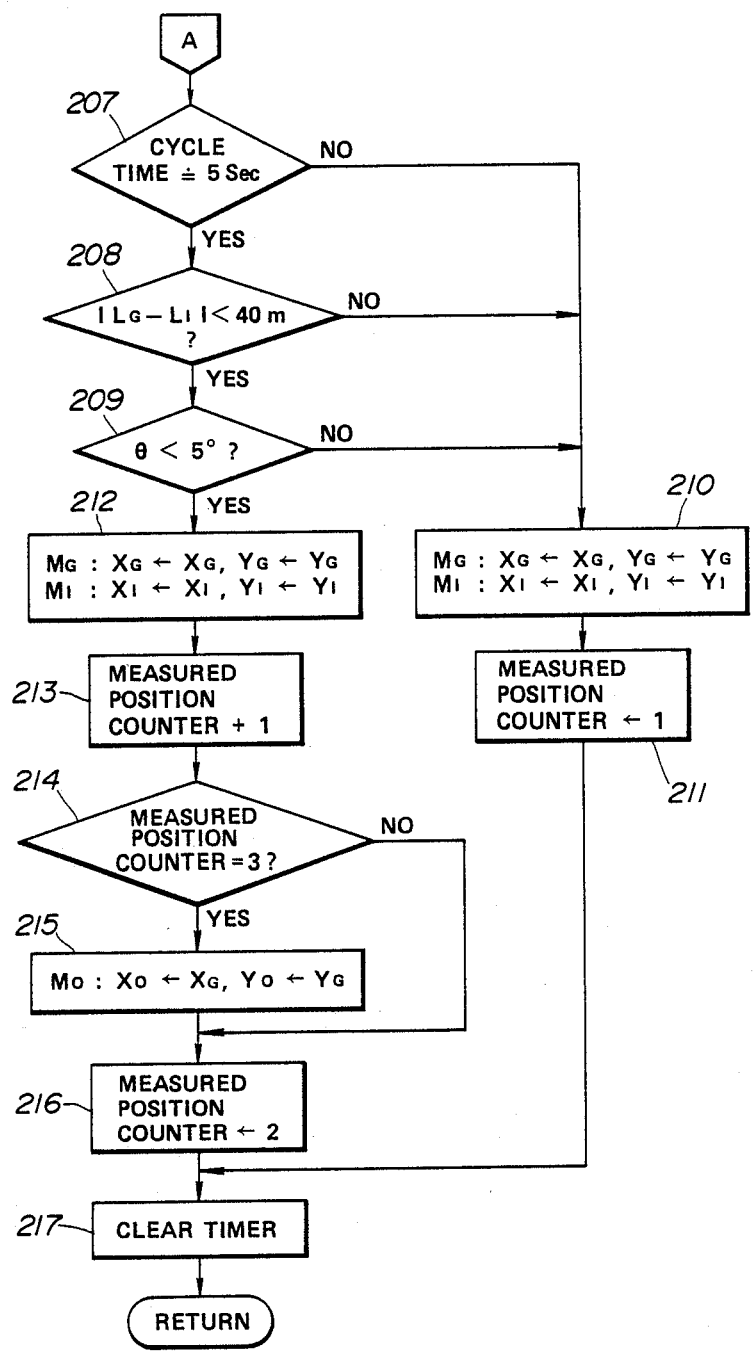

FIGS. 2(A) and 2(B) show operational flowcharts of a general concept of processing measurement results of the position measuring system shown in FIG. 1.

Figure 3:
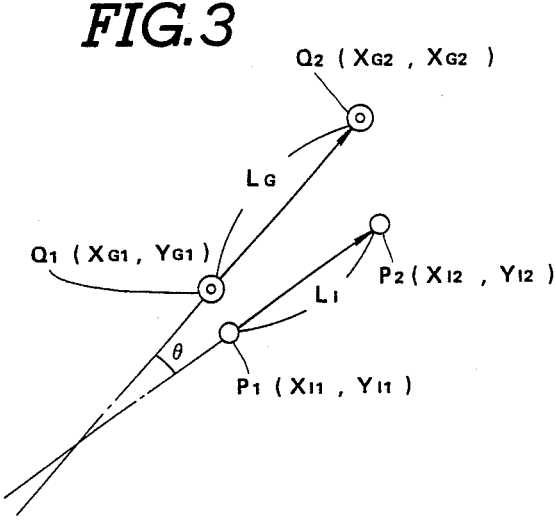
FIGS. 3, 4(A), 4(B), 4(C), and 4(D) are explanatory views of operation procedures of a GPS evaluation apparatus shown in FIG. 1.
Figure 4A:
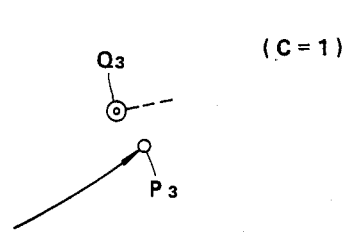
Figure 4B:
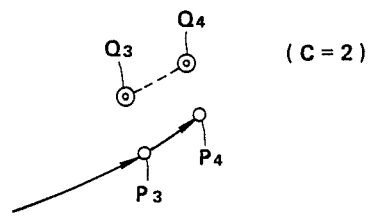
Figure 4C:
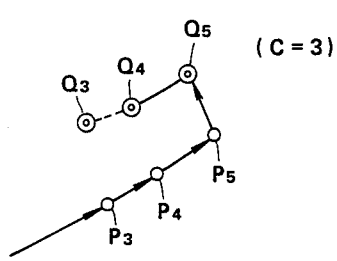
Figure 4D:
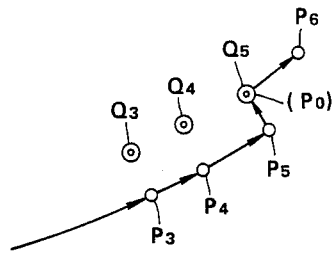

FIGS. 3, 4(A), 4(B). 4(C), and 4(D) show explanatory views for explaining processing procedures in a GPS (Global Positioning System) evaluation apparatus shown in FIG. 1.

As shown in FIG. 1, the position measuring system in the preferred embodiment includes a GPS position measuring apparatus 1, an integration calculation position measuring apparatus 2, and GPS evaluation apparatus 3. The integration calculation position measuring apparatus 2 is connected to a route guiding apparatus 4. The route guiding apparatus 4 includes a Cathode Ray Tube CRT. The route guiding apparatus 4 is exemplified by a U.S. patent application Ser. No. 842,363 filed on Mar. 19, 1986, the disclosure of which is hereby incorporated by reference.

The GPS position measuring apparatus 1 includes an antenna 5. The GPS position measuring apparatus 1 measures a position of the antenna 5 on the basis of satellite data on a plurality of satellites trapped by means of the antenna 5, i.e., the position of the moving object (vehicle) and stores the measured position expressed as (XG, YG) into a memory MG incorporated thereinto.

The detailed construction of the GPS position measuring apparatus is exemplified by a U.S. Pat. No. 4,445,118. The disclosure of the above-identified U.S. patent is hereby incorporated by reference.

The integration calculation position measuring apparatus 2 includes a direction sensor 6 using a gyroscope or geomagnetic sensor and vehicle speed sensor 7. The structure of the geomagnetic sensor is exemplified by a U.S. Pat No. 4,622,74, the disclosure of which is hereby incorporated by reference. The integration calculation position measuring apparatus 2 further comprises a first memory Mo storing a reference position represented by X, Y coordinates, i.e., Xo, Yo and a second memory Mi storing the integration calculation position of a moving object such as a vehicle. The integration calculation position measuring apparatus 2 updates and stores the present position (X2, Y2) of the vehicle (not shown) into the second memory Mi. The present position of the vehicle is derived by summing the reference position (Xo, Yo) to an integration value with respect to time $\int \theta \cdot v \cdot dt$ of a product $\theta \cdot v$ of detection values obtained from both corresponding sensors 6 and 7.

The GPS evaluation apparatus 3 includes a position measuring counter 8 and timer 9 to be described later. When a reliability of the position XG, YG, measured by means of the GPS position measuring apparatus 1, is high as the position data of the vehicle, the position data XG, YG derived by the GPS position measuring apparatus 1 is read into the first memory Mo of the integration calculation position measuring apparatus 2 to update the reference position Xo, Yo of the integration calculation position measuring apparatus 2.

The GPS position measuring apparatus 1 traps the plurality of GPS geostationary satellites sequentially or simultaneously and continues to update the contents of memory for satellite position data storage sequentially (not shown) according to the trapped result.

FIGS. 2(A) and 2(B) together show a processing routine of the whole system including the GPS evaluation apparatus 3.

First, in a step 201, an interrupt processing in a unit of 10 ms is carried out.

In a step 202, the GPS evaluation apparatus 3 determines whether the GPS satellite data stored in the memory $M_G$ is updated or not. If the update is carried out (yes), the routine goes to a step 203. If the update is not carried out, the routine returns to the step 201.

In the step 203, the GPS position measuring apparatus 1 executes a calculation processing of the present position of XG, YG and calculating processing of a DOP (Dilution of Precision) value.

A step 204 represents an evaluation processing of the DOP value in the GPS evaluation apparatus 3. In the step 204, the apparatus 3 determines whether the DOP value is equal to or less than 10. If it is equal to or less than 10, the apparatus 3 determines that the reliability of the measurement result derived from the GPS position measuring apparatus 1 is high and the routine goes to a step 205. If it is greater than 10, the routine goes to the step 201 since the apparatus 3 determines that the measurement result derived therefrom is not reliable.

The step 205 represents a processing of evaluation in the GPS evaluation apparatus 3 which determines whether an intensity I of electromagnetic wave received from the antenna 5 is equal to or positively greater than $-160$ dbm. If $I \geq -160$ dbm, the routine goes to a step 206 since the apparatus 3 determines a favorable reception state of the wave. If not, the routine returns to the step 201.

The step 206 represents another evaluation processing of the GPS evaluation apparatus 3. In the step 206, the apparatus 3 determines whether a distance difference between the position data XG, YG measured by means of the GPS position measuring apparatus 1 and the position data XI, YI measured by means of the integration calculation position measuring apparatus 2 is less than 2 kilometers. If it is less than 2 Km $$(\sqrt{(X_G - X_I)^2 + (Y_G - Y_I)^2} < 2 \text{ Km}),$$

the routine goes to a step 207. If it is equal to or greater than 2 Km, the apparatus 3 determines that the measurement result of the GPS position measuring apparatus 1 is not reliable and the routine returns to the step 201.

The step 207 represents a processing of the apparatus 3 in which a cycle time of the processing passing through the step 207 is measured. In the step 207, the apparatus 3 determines whether the cycle time is substantially five seconds or not. If it is substantially five seconds, the routine goes to a step 208. If it is largely separated from five seconds, i.e., the cycle time is considerably longer than five seconds, the routine returns to the step 210.

The time of five seconds represents a standard operation time for the GPS position measuring apparatus 1 to output a measurement result of the position. That is to say, the GPS position measuring apparatus 1 carries out the position measurement processing usually in a unit of substantially five seconds and outputs the measurement result for each of five seconds multiplied by n (n represents an integer) upon the start of measurement. However, the GPS position measuring apparatus 1 often delays the position measuring processing due to troubles in the trapping of one of the geostationary satellites. Therefore, the step 207 serves to evaluate such a time delay.

The step 208 represents a still another evaluation processing in the GPS evaluation apparatus 3. In the step 208, the difference distance $L_G$ of the present and previous measurement results in the GPS position measuring apparatus 1 is compared with that $L_I$ in the integration calculation position measuring apparatus 2. In the step 208, the routine goes to a step 209 if an absolute difference $|L_G - L_I|$ is less than 40 meters. The routine goes to a step 210 if the difference is equal to or greater than 40 m.

FIG. 3 shows a situation in the comparison processing in the step 208. In FIG. 3, Q1, and Q2 denote the present and previous measured positions (immediately before the present position) in the GPS position measuring apparatus 1 and P1 and P2 denote the corresponding measured positions (positionally corresponding to those P1 and P2) in the integration calculation position measuring apparatus 2. In the step 208, the evaluation apparatus 3 evaluates the two measurement results of the GPS position measuring apparatus 1 by determining whether the difference of both distances $|L_G - L_I|$ is shorter than 40 meters or not, i.e., from the result of comparing the distance of $L_G$ to that of $L_I$.

The step 209 represents another evaluation processing in the GPS evaluation apparatus 3. The GPS evaluation apparatus 3 determines whether an angle $\theta$ at which a straight line connecting the present and previous measuring points Q1, Q2 in the GPS position measuring apparatus 1 is intersected by a straight line connecting the present and previous measured points P1, P2 (refer to FIG. 3) is less than five degrees or not. If it is less than five degrees, the routine goes to a step 212. If the intersecting angle $\theta$ is equal to or greater than five degrees, the routine goes to the step 210 since the evaluation apparatus 3 determines that the consecutive two measurement results of the GPS position measuring apparatus 1 is less reliable.

In the step 210, the measurement result XG, YG of the GPS position measuring apparatus 1 is stored into the first memory MG and the measurement result XG, YG of the integration measuring apparatus 2 is stored into the second memory MI of the integration calculation position measuring apparatus 2.

A step 211 represents a processing which forcibly sets the count value of the measured position counter 8 to 1.

On the other hand, a step 212 and later steps carry out the memory updating processing in the same way as in the step 210. Next, in the step 213, the count value of the measured position counter 8 is incremented by one. In a step 214, the apparatus 3 determines whether the counted number is three or not. If it is three, the routine goes to a step 215. If not three, the routine goes to a step 216.

The step 215 represents a processing to set the subsequent measurement result XG, YG of the GPS position measuring apparatus 1 into the first memory Mo of the integration calculation position measuring apparatus 2. The step 216 represents a processing which forcibly sets the number of counts in the measuring position counter to two. A step 217 represents a processing of clearing a measurement time of the timer 9.

The following is a detailed description of the contents of the steps 208 to 216.

As shown in FIGS. 4(A) through 4(D), the positions Q3, Q4, Q5 are sequentially measured which correspond to the positions P3, P4, and P5 measured by means of the integration calculation position measuring apparatus 2. In the step 214, the apparatus 3 determines whether the count number of the measurement position counter is three or not, i.e., whether the measurement results of the GPS position measuring apparatus 1 are twice continuously highly reliable.

In addition, when the apparatus 3 determines that the twice measured results Q4 and Q5 are highly reliable, the integration calculation position measuring apparatus 2 adopts the subsequently measured result Q5 as the reference position Po and executes the subsequent measurement of the position Q6 of the vehicle.

As described above, the position measuring system evaluates the DOP value in the step 204, evaluates the reception intensity of the electromagnetic wave in the step 205, and evaluates roughly the measured position in the step 206. Furthermore, the system evaluates the measuring cycle in the step 207 and evaluates the measured value of the moved distance in the step 208. The system evaluates an ingredient, i.e., the angle $\theta$ of the moved straight line in the step 209.

In the step 214, the reference position Po of the integration calculation position measuring apparatus 2 is updated by the measured position XG, YG of the GPS position measuring apparatus 1 only when the evaluation results of the step 208 and step 209 are twice continuously favorable.

Hence, the measurement result of the electromagnetic wave position measuring apparatus 1 outputted to the integration calculation position measuring apparatus 2 is always a reliable indication of the position of the vehicle with the result of the measurement in an unstable electromagnetic wave state eliminated so that the measurement result of the integration calculation position measuring apparatus always provides a highly precise indication of the position of the vehicle.

Although in the preferred embodiment the evaluatiOn procedure in the steps 207, 208, and 209 is serially carried out in order to provide an increased reliability for the measurement result of the integration calculation position measuring apparatus 2, the evaluation procedure may be carried out in parallel with each other in these steps or, alternatively, be carried out selectively.

In addition, although in the above-described preferred embodiment the steps 208 and 209 execute the comparison processings in which the present and previous measured values are compared to each other, the present and two or more previous measured values may be compared.

Furthermore, although in the above-described preferred embodiment the GPS electromagnetic wave position measuring apparatus is used as the electromagnetic wave position measuring apparatus, another type of the electromagnetic wave position measuring apparatus, for example, a Loran-C electromagnetic wave navigation apparatus may be used.

The Loran-C electromagnetic wave receiving apparatus is exemplified in a U.S. Pat. No. 4,594,594. The disclosure of the above-identified United States patent is hereby incorporated by reference.

As described hereinabove, the system and method for measuring the position of the moving object according to the present invention can provide a more highly reliable measurement result of the position of the moving object since the position measured by means of the electromagnetic wave position measuring apparatus is evaluated in connection with the position measured by means of the integration calculation position measuring apparatus so as to increase the reliability of the measurement result of the electromagnetic wave position measuring apparatus and the reference position of the integration calculation position measuring apparatus can be set to the correct position.

It will fully be appreciated by those skilled in the art that the foregoing description is made in terms of the preferred embodiment and various change and modifications may be made without departing from the scope of the present invention which is to be defined by the following claims.

What is claimed is:

1. A hybrid system for deriving a position of a moving object, comprising:
   (a) first means for receiving an electromagnetic wave from at least one satellite and a Global Positioning System for the measurement of an absolute position of the moving object and for deriving the position of the moving object on the basis of data from the received electromagnetic wave;
   (b) second means, having a first sensor for detecting a movement direction of the moving object and a second sensor for detecting a movement speed of the moving object, for calculating a product of the detected movement direction and movement speed of the moving object and integrating the product with respect to time so as to derive a movement distance of the moving object and direction thereof with respect to a reference position and for calculating a sum of
      (i) the derived movement distance, and
      (ii) direction and the reference position so as to derive a current position of the moving object;
   (c) third means for comparing at least two successively derived positions of the first means with the derived current position of the second means so as to evaluate a reliability of the at least two derived positions of the first means; and
   (d) fourth means for setting a latter one of said at least two derived positions of the third means as the reference position when the third means evaluates that the two derived positions of the first means are reliable.

2. The system according to claim 1, which further comprises means for calculating a Dilution of Precision (DOP) value of the derived position of the moving object outputted by the first means and means for evaluating the reliability of each derived position of the first means on the basis of whether the DOP value calculated by the means for calculating a DOP value is equal to or less than a predetermined value.

3. The system according to claim 1, which further comprises means for measuring an intensity of the received electromagnetic wave and means for evaluating the reliability of each measurement result of the first means by determining whether the measured intensity is equal to or higher than a predetermined value.

4. The system according to claim 1, which further comprises means for measuring a processing interval of time at which the first means measures the position of the moving object and means for evaluating the reliability of each measurement result of the first means by determining whether the processing interval of time is substantially five seconds.

5. The system according to claim 1, wherein the third means evaluates the reliability of each of two derived positions of the first means by comparing a distance between two derived position points derived by the first means to the distance between two points calculated by the second means and determines that the derived positions of the first means are reliable when a difference between the distances is shorter than a predetermined distance.

6. The system according to claim 1, wherein the third means evaluates the reliability of each of the two derived positions of the first means by comparing a direction of straight line connecting points of position derived by the first means to that calculated by the second means and evaluates that the derived positions of the first means are reliable when an angle at which both straight lines intersect is smaller than a predetermined angle.

7. The system according to claim 5, wherein the third means evaluates the reliability of the two derived positions of the first means by comparing a distance between two points of position derived by the first means to that calculated by the second means and evaluates that the derived positions of the first means are reliable when a difference between the distances is shorter than a predetermined distance.

8. The system according to claim 5, wherein the predetermined distance is 40 meters.

9. The system according to claim 6, wherein the predetermined angle is five degrees.

10. The system according to claim 1, wherein the positions of both first and second means are those respectively derived and calculated at the present time and a preceding time.

11. The system according to claim 1, wherein the positions of both first and second means are those respectively derived and calculated at the present time and a time preceding a preceding time.

12. The system according to claim 1, further including means for controlling sequential outputting of calculated positions of the second means as the positions of the moving object when the two derived positions of the first means are not reliable.

13. A position determining system for a vehicle, comprising:
(a) first means for receiving an electromagnetic wave and deriving the position of the vehicle on the basis of the received electromagnetic wave;
(b) second means for calculating the position of the vehicle with respect to a reference position on the basis of an integration of a product of a moving direction and speed of the vehicle with respect to time, the reference position being calculated from the position of the vehicle derived by the first means;
(c) third means for evaluating the reliability of each derived position of the first means by comparing each calculated position of the second means with the corresponding derived position of said first means and setting, as a reference position in the second means, one of the derived positions subsequent to at least two consecutive derived positions of the first means which are evaluated to be reliable; and
(d) fourth means for outputting the derived position of the first means, subsequent to the two derived positions of the first means evaluated as being reliable, as the position data of the vehicle.

14. A method for deriving a position of a moving object, comprising the steps of:
(a) deriving the position of the moving object using an electromagnetic wave position measuring apparatus;
(b) calculating the position of the moving object using an integration calculating apparatus in which the position of the moving object is derived by the sum of
  (i) a calculated distance and direction of the moving object, and
  (ii) a reference position, the calculated distance and direction of the moving object being calculated by integrating a product, over time, of the movement direction and movement speed of the moving object;
(c) evaluating a reliability of at least two derived positions of said deriving step on the basis of comparing the calculated positions of the integration calculating apparatus corresponding to positions derived by the electromagnetic wave position measuring apparatus; and
(d) setting the derived position of the electromagnetic wave position measuring apparatus subsequent to the derived positions of the electromagnetic wave position measuring apparatus evaluated in the step (c) as a reference position when the derived positions of the electromagnetic wave position measuring apparatus are evaluated as being reliable.

* * * * *